US011184240B2

(12) United States Patent
Trossen (10) Patent No.: US 11,184,240 B2
(45) Date of Patent: Nov. 23, 2021

(54) PATH INFORMATION UPDATES IN INFORMATION-CENTRIC NETWORKING (71) Applicant: IDAC Holdings, Inc., Wilmington, DE (US)

(72) Inventor: Dirk Trossen, London (GB)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/743,303

(22) PCT Filed: Jul. 8, 2016

(86) PCT No.: PCT/US2016/041431
§ 371 (c)(1),
(2) Date: Jan. 10, 2018

(87) PCT Pub. No.: WO2017/011284
PCT Pub. Date: Jan. 19, 2017

(65) Prior Publication Data
US 2018/0198684 A1 Jul. 12, 2018

Related U.S. Application Data (60) Provisional application No. 62/190,972, filed on Jul. 10, 2015.

(51) Int. Cl.
*H04L 12/24* (2006.01)
*H04W 40/24* (2009.01)
(Continued)

(52) U.S. Cl.
CPC .......... *H04L 41/12* (2013.01); *H04L 41/0654* (2013.01); *H04L 67/327* (2013.01);
(Continued)

(58) Field of Classification Search
CPC . H04W 28/021; H04W 40/242; H04W 84/00; H04W 84/0005; H04W 84/18;
(Continued)

(56) References Cited

U.S. PATENT DOCUMENTS 7,698,463 B2   4/2010   Ogier et al.
7,801,857 B2   9/2010   Betts et al.
(Continued)

FOREIGN PATENT DOCUMENTS

CN   102984174 A   3/2013
CN   104540038 A   4/2015
(Continued)

OTHER PUBLICATIONS

Named Data Networking, Available at http://named-data.net , 2014, 9 pages.
(Continued)

*Primary Examiner* — Ashley Shivers
(74) *Attorney, Agent, or Firm* — Condo Roccia Koptiw LLP (57) ABSTRACT Systems, methods, and instrumentalities are disclosed to communicate with subscribers in an information-centric networking environment. A WTRU may store a first path from the WTRU to a first subscriber and a second path from the WTRU to a second subscriber. A message from a topology manager may be received. The message may indicate a change to a network topology. In response to a determination that the change to the network topology relates to the first path and does not relate to the second path, the WTRU may remove the first path from the memory and maintain the second path in the memory. The WTRU may send a request to the topology manager for a third path to replace the first path that was removed from memory. In response to the above determination, a portion of the first
(Continued)

path may be removed and replaced according to the above mechanism.

26 Claims, 7 Drawing Sheets

(51) Int. Cl.
*H04L 29/08* (2006.01)
*H04L 12/725* (2013.01)
*H04L 12/707* (2013.01)
*H04L 12/703* (2013.01)

(52) U.S. Cl.
CPC .............. *H04W 40/24* (2013.01); *H04L 45/24* (2013.01); *H04L 45/28* (2013.01); *H04L 45/306* (2013.01)

(58) Field of Classification Search
CPC .... H04W 40/24; H04L 41/12; H04L 41/0654; H04L 67/327; H04L 45/306; H04L 45/24; H04L 45/28
See application file for complete search history.

(56) References Cited

U.S. PATENT DOCUMENTS

| 2009/0073924 A1* | 3/2009 | Chou ............... H04L 45/26 370/328 |
| 2014/0192677 A1 | 7/2014 | Chew et al. |
| 2014/0317271 A1 | 10/2014 | Kim et al. |
| 2015/0195764 A1 | 7/2015 | Chung et al. |
| 2015/0208318 A1* | 7/2015 | Mosko ............... H04W 40/04 370/310 |
| 2016/0100316 A1* | 4/2016 | Mosko ............... H04W 16/04 370/254 |
| 2016/0134510 A1 | 5/2016 | Xuan et al. |
| 2016/0234738 A1* | 8/2016 | Yan ............... H04W 40/02 |
| 2016/0269272 A1 | 9/2016 | Li et al. |
| 2017/0237660 A1 | 8/2017 | Trossen et al. |

FOREIGN PATENT DOCUMENTS

| CN | 104780101 A | 7/2015 |
| WO | WO 2015/010519 A1 | 1/2015 |
| WO | WO 2016/058263 A1 | 4/2016 |
| WO | WO 2016/123516 A1 | 8/2016 |

OTHER PUBLICATIONS

Al-Khalidi et al., "Point: iP Over IcN—the betTer ip", Deliverable D4.1, Evaluation Plan and Initial Validation Report, Aug. 31, 2015, 39 pages.
Jokela et al., "LIPSIN: Line Speed Publish/Subscribe Inter-Networking", ACM SIGCOMM Computer Communication Review, vol. 39, No. 4, Barcelona, Spain, Aug. 17-21, 2009, pp. 195-206.
Trossen et al., "PURSUIT: Publish Subscribe Internet Technology—Deliverable-D2.5", Final Updated Architecture, FP7-INFSO-ICT 257217, Mar. 2013, 82 pages.

* cited by examiner

| Type | Number of IDs | ID1, ..., IDn |
|---|---|---|

PATH INFORMATION UPDATES IN INFORMATION-CENTRIC NETWORKING

CROSS REFERENCE

This application is the National Stage Entry under 35 U.S.C. § 371 of Patent Cooperation Treaty Application No. PCT/US2016/041431, filed Jul. 8, 2016, which claims the benefit of U.S. Provisional Application No. 62/190,972 filed on Jul. 10, 2015, which is incorporated herein by reference as if fully set forth.

BACKGROUND

Information-centric networking (ICN) may allow content to be exchanged through information addressing. ICN may connect appropriate networked entities that are suitable to act as a source of information, towards the networked entity that requested the content.

SUMMARY

Systems, methods, and instrumentalities are disclosed for updating path information in information-centric networking (ICN) environments. Updates may be made to source path forwarding information. Source path forwarding information may be necessary for communication between two ICN devices. An ICN Topology Manager may initiate an update of source path forwarding information towards a number of devices (e.g., connected ICN devices) in an ICN network. An ICN device may update its path information based on received update information for path information (e.g., source path forwarding information).

Systems, methods, and instrumentalities are disclosed for updating a path in a network. Updating a path may comprise receiving updated network information (such as, for example, leaf node changes or link changes), and sending an information identifier comprising one or more node identifiers and/or link identifiers to a publisher. The publisher may, e.g., upon receipt of the information identifier, remove path information that includes node identifiers and/or link identifiers from a stored path table.

Systems, methods, and instrumentalities are disclosed for updating a path in a network comprising receiving updated network information (such as, for example, leaf node changes or link changes); and sending an information identifier comprising one or more node identifiers and/or link identifiers to an rendezvous ("RV") function. The RV function may interrogate its internal rendezvous state (e.g., including a graph of information identifiers currently being published to the RV and node identifiers which have published or subscribed to the information identifier).

Systems, methods, and instrumentalities are disclosed to communicate with subscribers in an information-centric networking environment. A WTRU may store one or more paths (e.g., one or more paths to subscribers). The paths may be stored in memory and may include a first path from the WTRU to a first subscriber and a second path from the WTRU to a second subscriber. A message from a network entity (e.g., a topology manager) may be received. The message may indicate a change to a network topology. The change to the network topology may include a leaf node joining the ICN, a leaf node leaving the ICN, a network link joining the ICN, a network link leaving the ICN, and/or a failure of a network link. For example, the change to the network topology may indicate that a link associated with the first path is no longer available. In response to a determination that the change to the network topology relates to the first path (e.g., a link in the first path is no longer available) and does not relate to the second path (e.g., no links in the second path are affected), the WTRU may remove the first path from the memory and maintain the second path in the memory. The WTRU may send a request to a network entity (e.g., topology manager) for a path (e.g., a third path) to replace the first path that was removed from memory. For example, the WTRU may wait until the WTRU has a message to send to the first subscriber before sending the request for the path to replace the first path that was removed from memory. In response to the above determination, a portion of the first path may be removed and replaced according to the above mechanism.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

In information-centric networking (ICN), content may be exchanged through information addressing. Networked entities may be selected to forward information from a content source towards a networked entity that requested the content. Network infrastructure may be changed in order to implement desired network-level functions. For example, a migration scenario may be provided such that proposed architectures could be implemented as overlay(s) over existing (such as, for example, IP- or local Ethernet-based) architectures.

Transition to ICN at the network level may increase efficiency. For example, transition to ICN at the network level may increase efficiency through usage of in-network caches and/or spatial/temporal decoupling of sender/receiver, in general, and/or utilization of software-defined networking (SDN) upgrades for better flow management, etc. Approaches may include IP-based services on top of ICN architectures.

Figure 1:
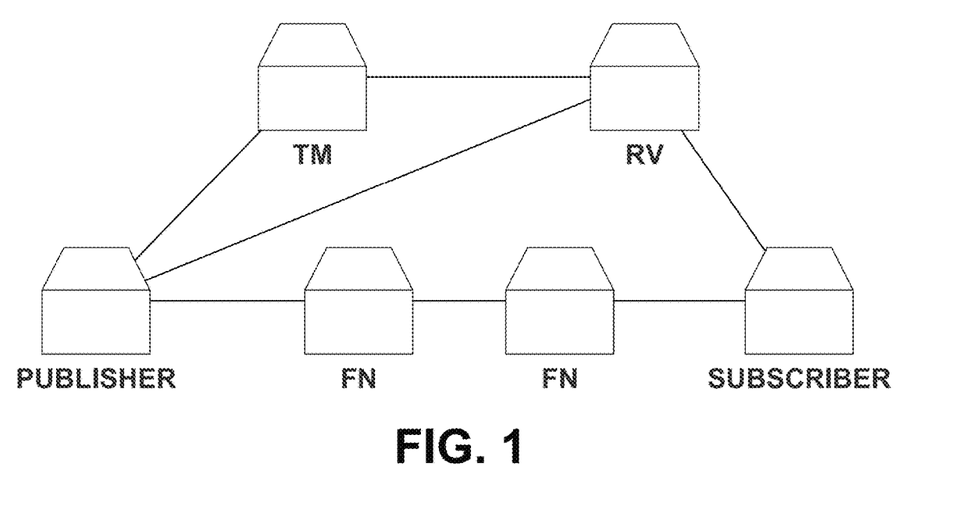
FIG. 1 is a diagram of an example ICN Architecture.

FIG. 1 is a diagram of an example ICN Architecture, which illustrates example functions. Network functions may include a rendezvous ("RV") function. For example, the rendezvous ("RV") function may match demand of, and/or supply for, information. A network function may include a topology manager ("TM") function. For example, a topology manager ("TM") function may determine a set (e.g., suitable set) of communication resources (e.g., network links) to deliver the information over. A network function may include a forwarding ("FN") function. For example, a forwarding ("FN") function may send the information (e.g., via links) from a source (e.g., publisher) to the requestor of the information (e.g., subscriber). The publisher of information may be the node sending information to a subscriber (e.g., the subscriber that requested the information).

A TM (e.g., as part of its operations) may determine information (e.g., a source path information). Source path information may include compressing a set of link identifiers into a path information identifier. For example, source path information may include compressing a set of link identifiers into a path information identifier, such as a single Bloom filter based path information identifier of constant length. The set of link identifiers may represent a path from a publisher to a subscriber(s). The link identifiers may be assigned during a phase (e.g., an initial network attachment phase). The path information identifier may be used by a FN (e.g., FN function) for forwarding the information from the publisher to the subscriber(s). For example, the path information identifier may be used by the FN for forwarding the information from the publisher to the subscriber(s) by executing a AND/CMP operation over link identifiers (e.g., all local link identifiers). The publisher may provide the path identifier. For example, the publisher may provide the path identifier as part of the packet being sent to the first FN on the path to the subscriber. The publisher may provide the path identifier for the forwarding of information to be initiated.

The path information identifier may be stored at the publisher, for example, to send information (e.g., repeated sending of information) from the publisher to the subscriber. For example, the path information identifier may be stored at the publisher (e.g., in the memory of the publisher). Path information may include one or more paths from the publisher to one or more subscribers. The stored path information identifier may be re-used in the case of repeated publish operations. The stored path information identifier may promote efficiency. For example, the stored path information identifier may promote efficiency by avoiding further RV and/or TM operations (e.g., associated delay and/or resource use).

Publishing nodes may maintain an internal path table with such path information identifiers. A (e.g., each) forwarding identifier in the table may be complemented by the node identifiers along the path. For example, a forwarding identifier in the table may be complemented by the node identifiers along the path if publishing nodes maintain an internal path table with such path information identifiers. A (e.g., each) node attaching to the ICN network may get assigned one or more node identifiers. Re-use of path information may lead to failure. For example, re-use of path information may lead to failure if the links constituting the path change in the network. Examples of such changes in the network (e.g., changes to the link defining the overall network topology) may include a disappearance of leaf nodes (e.g., subscribers) from the network, failures of network links, and/or failures of network nodes implementing the aforementioned network functions (i.e., RV, TM, and/or FN). A TM may monitor link state information, e.g., through software-defined networking (SDN) approaches and/or other link state information protocols. Reusing path information at the publisher (e.g., circumventing the RV and/or TM) may lead to using outdated path information at the publishers. For example, storing path information identifier at the publisher may lead to using outdated path information at the publishers due to the re-use of the (e.g., stale) path information. Outdated path information may be associated with potential information loss. For example, outdated path information may be associated with potential information loss if the information does not arrive at the subscriber(s). Disappearance of a subscriber may lead to transfers (e.g., unnecessary transfers). For example, disappearance of a subscriber may lead to transfers since the intended receiver of the information has disappeared. It may be desirable to stop transfers (e.g., unnecessary transfers) at the publisher.

The topology manager may provide information to the publisher. The topology manager may notify the publisher of a change in state information (e.g., link state information and/or leaf node information). The topology manager may provide information to the publisher if and/or when the publisher updates the path information. For example, the topology manager may provide information to the publisher when the publisher requests path information (e.g., a first time request or an update). For example, the publisher may wait until it has a message to send to the subscriber before requesting the path information. The publisher may send information (e.g., published information) along the network paths.

Updated network information may include leaf node changes. Leaf nodes may be one or more of publisher(s) and/or subscriber(s). For example, leaf node changes may include publisher(s) and/or subscriber(s) that have joined and/or left the network. Updated network information may include network nodes implementing the FN network function. Nodes may leave the network gracefully (e.g., terminate their subscriptions and/or publications in the ICN network with notice to the network and/or according to predetermined actions). Nodes may leave the network ungracefully (e.g., through failure at the node, and/or without notice). Leaf node changes may include a node joining the network. A node joining the network may perform operations (e.g., suitable publish/subscribe operations) to include itself into the delivery and/or reception of information.

A node change of a node ungracefully leaving the network (e.g., due to failure at the node of connecting link level), may be disruptive. Information of nodes that have left the network may need to be communicated to one or more publisher nodes to avoid the use of stale path information. For example, information of nodes that have left the network may need to be communicated to one or more publisher nodes in case these publishers are currently communicating with the node(s) that have left. Node identifiers may be provided for these nodes. Node identifiers may be assigned during a network attachment phase and/or may be used throughout the formation of path information in the TM operations. Node identifiers may be used in the publisher nodes to associate particular path information to the nodes to which these publishers may deliver information.

Updated network information may include network link changes. Network links may have been added to the delivery network (e.g., link addition). For example, optimized paths may be formed. Network links may have been removed from the delivery network (e.g., link removal). For example, paths formed before removal may be invalid since they may include the removed link.

For link addition, the new links may be assigned a link identifier. A link identifier may be used to form the path information by building a suitable Bloom Filter based identifier. The link identifier may be represented by a domain-locally unique identifier.

For link removal, the links may be represented by their assigned link identifier.

In addition to the link identifiers, the TM may determine publisher nodes that may be affected by link removals and/or additions. The TM may determine nodes (e.g., all nodes) that may lie on a path (e.g., shortest path) from one or more other nodes in the network. This may be useful for TM policies where path information may be determined based on a shortest path policy. The TM may convey the affected nodes, because path information at publishers may include a path with invalid links towards these affected nodes. The TM may convey the affected nodes, in addition to the removed links.

Monitoring the network information may be realized in one or more ways. For example, monitoring the network information may be realized by link state protocols (e.g., based on frequent link state updates from network nodes in the network). Monitoring the network information may be realized by SDN-based solutions (which may use SDN switch based monitoring information for deriving suitable network state information). The TM may be aware of information (e.g., current network information). For example, because the TM may be aware of current network information, the TM may be aware of one or more changes, e.g., in network topology.

The TM may convey information (e.g., network update information) to the publisher nodes and/or the RV function. Network update information may include information about deleted links. Network update information may include information about a more efficient path (e.g., due to addition(s) and/or deletions of network nodes). Updated network information may include updates to affected paths but not updates to unaffected paths. The TM may utilize native multicast capabilities of a system. For example, the TM may utilize native multicast capabilities of a system to deliver the network update information.

One or more leaf nodes may subscribe to a preselected (e.g., standardized and/or implemented) information identifier. The preselected information identifier may represent network update information of the TM function. For example, the preselected information identifier may represent network update information of the TM function while the TM function may act as the publisher to the preselected information identifier.

The RV function may subscribe to the preselected information identifier. The preselected information identifier may represent network update information of the TM function. For example, the preselected information identifier may represent network update information of the TM function while the TM function may act as the publisher to the preselected information identifier.

When a leaf node changes and/or a network link changes, update messages may be published on (e.g., sent via) the preselected information identifier. Publisher nodes may subscribe to the leaf node changes and/or network link changes by subscribing to the preselected information identifier. The publisher nodes may determine if the published leaf node changes and/or the network link changes affect network path information. For example, the publisher nodes may determine if the published leaf node changes affect one or more network paths and/or do not affect one or more other network paths.

A preselected information identifier may be included into a management approach. The management approach may be represented by a namespace. For example, a root scope (e.g., possibly standardized) may be used for management information and/or the preselected information identifier (e.g., for network update information) may be included in the namespace (e.g., within a given sub-scope).

Figure 2:
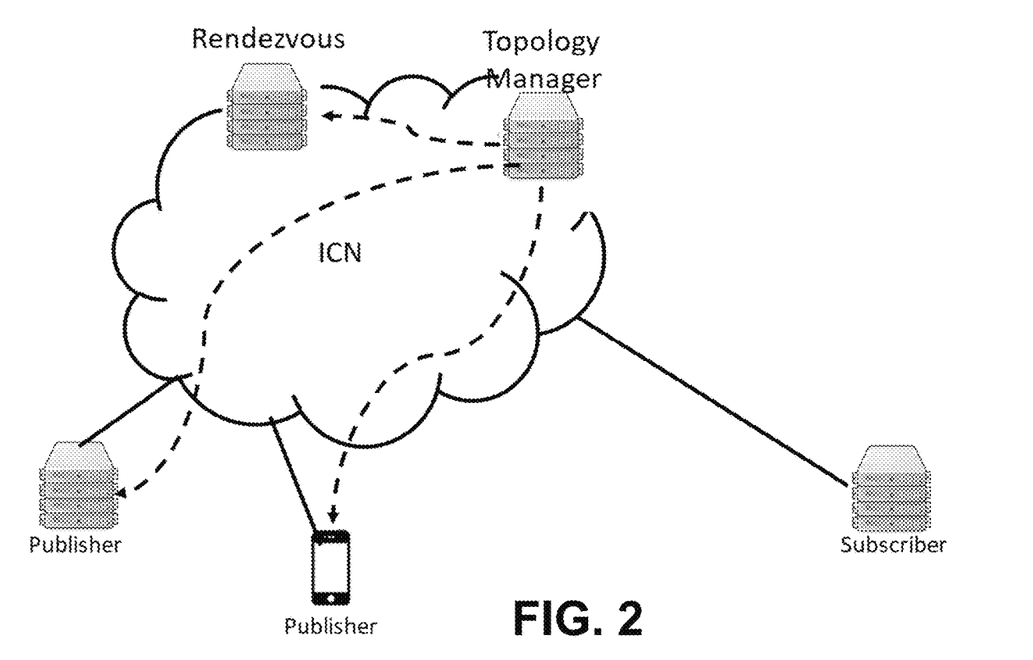
FIG. 2 is a diagram of an example Topology Manager communicating network update information.

FIG. 2 is a diagram of an example Topology Manager communicating network update information. Communication of the network update information may be between the TM and the RV and/or the publishers. Information transmission may be shown as dashed lines.

Information being published over the preselected information identifier may be part of a format (e.g., a defined format). The defined format may include the type of information being updated (e.g., node identifiers of leaf nodes and/or link identifiers for removed links). The defined format may include the information itself. For example, the defined format may include the information itself, according to the type. The defined format may include the information itself (e.g., according to the type) and/or may include length information for the number of identifiers being provided. The defined format may include information, for example, where the type of information may be that of node identifiers. The node identifier may be an identifier (e.g., a special identifier) to signal "ALL NODES" as being affected. The node identifier may signal changes to the network that may be substantial (e.g., parallel link failures). The node identifier may trigger (e.g., may recommend) purging of a path table (e.g., the entire path table). For example, the node identifier may trigger purging of an entire path table rather than the selective removal of a few nodes.

Figure 3:
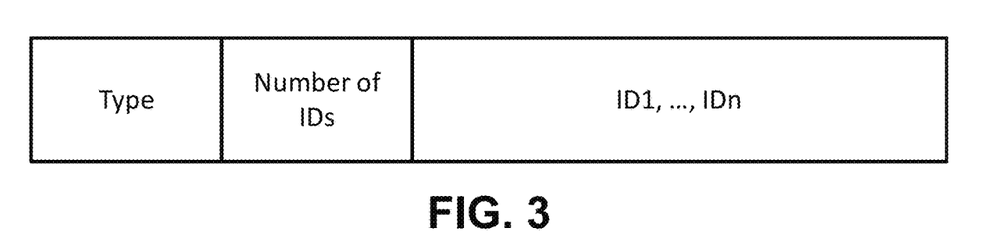
FIG. 3 is a diagram of an example packet format for network update information.

FIG. 3 is a diagram of an example packet format for network update information. A publisher/subscriber in the network (e.g., each publisher/subscriber in the network) may (e.g., may initially) subscribe to the preselected information identifier. For example, a publisher/subscriber in the network may subscribe to the preselected information identifier in order to receive information (e.g., node identifiers and/or link identifiers).

Figure 4:
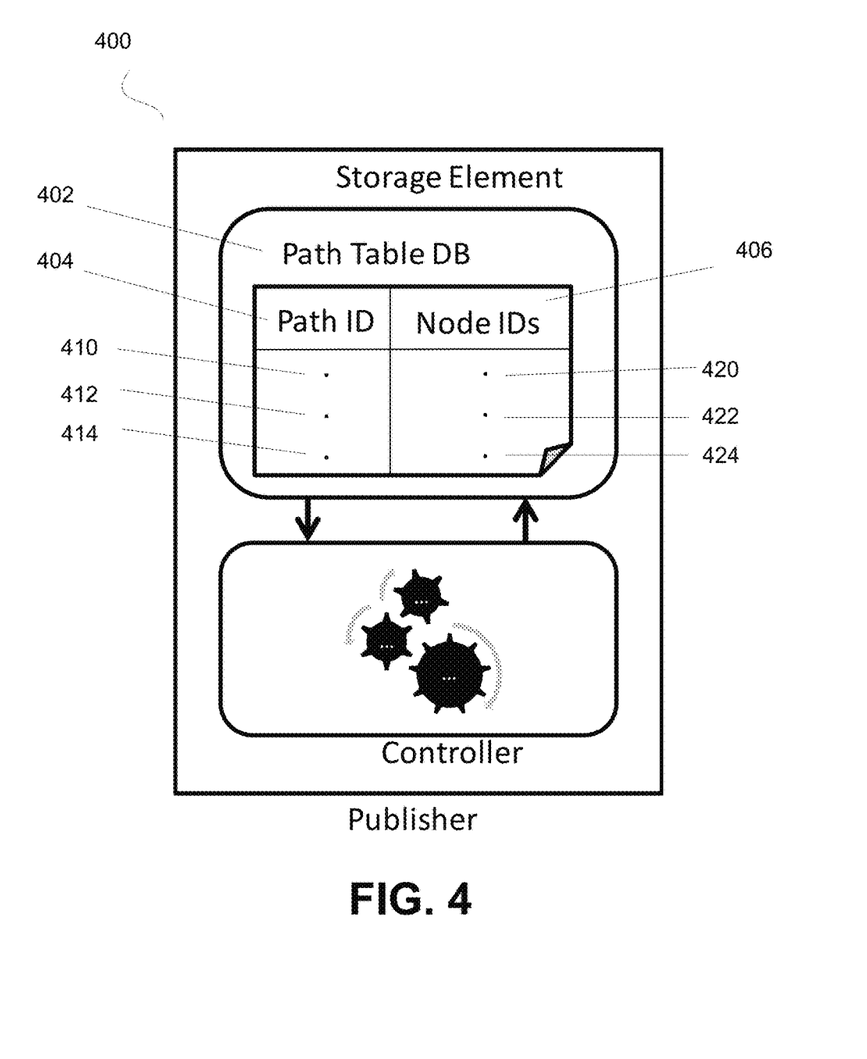
FIG. 4 is a diagram of an example internal path table at a publisher (e.g., content provider).

FIG. 4 is a diagram of an example internal path table 402. The internal path table 402 may be stored at a publisher 400 (e.g., content source, information provider, etc.). A recipient (e.g., a publisher) of the preselected information identifier (e.g., representing network updates) may retain an internal path table, such as internal path table 402. The internal path table 402 may include one or more paths that a publisher may use, e.g., when sending information (e.g., a message), to a subscriber. The internal path table 402 may include one or more path IDs 404 and/or one or more node IDs 406.

The Path IDs may identify a particular subscriber in which there is an identified path from a publisher and the Node IDs may identify the subscriber leaf nodes. For example, Path ID 410 may identify a first subscriber in which there is a path from the publisher, and corresponding Node IDs 420 may identify the subscriber leaf nodes of the path. Path ID 412 may identify a second subscriber in which there is a path from the publisher, and corresponding Node IDs 422 may identify the subscriber leaf nodes. Path ID 414 may identify a third subscriber in which there is a path from the publisher, and corresponding Node IDs 424 may identify the subscriber leaf nodes. Identification of a particular subscriber may be via the representation of links along the path as unique bit positions in a fixed or variable sized bit field.

The publisher 400 may need to send a message to a first subscriber. The publisher 400 may search information in the path table 402 to see if the path table 402 has a path stored to deliver the message to the first subscriber. For example, the publisher 400 may search the path table 402 and determine that the Path ID 410 identifies a first subscriber in which there is a path to from the publisher. The publisher 400 may send the message via the path identified by the node(s) in Node IDs 420.

The Path IDs may identify the nodes in an identified path to a particular subscriber and the Node IDs may identify the corresponding subscriber. The Path IDs may identify an intermediary node in the path, and/or the Path IDs may identify the last node in the path (e.g., the subscriber). Node IDs 406 may identify the subscriber corresponding to the nodes identified in Path IDs 404. For example, Path ID 410 may identify a first intermediary node in the path from the publisher, and/or corresponding Node IDs 420 may identify the corresponding first subscriber. Path ID 412 may identify a second intermediary node in the path from the publisher, and corresponding Node IDs 422 may identify the corresponding first subscriber. Path ID 414 may identify the last node in the path from the publisher (e.g., the subscriber), and corresponding Node IDs 424 may identify the subscriber.

The publisher 400 may need to send a message to a first subscriber. The publisher 400 may search information in the path table 402 to see if the path table 402 has a path stored to deliver the message to the first subscriber. For example, the publisher 400 may search the path table 402 and determine that the Path IDs 410, 412, 414 identify the nodes that comprise a path from the publisher to the first subscriber. The publisher 400 may send the message via the path identified by the node(s) in Path IDs 410 412, 414. The publisher 400 may send the message to the subscriber identified in corresponding Node IDs 420, 422, 424.

The receiving node (e.g., publisher) may consult its internal path table and/or remove path information that may include the received node identifier(s). For example, the receiving node may consult its internal path table and/or remove path information (e.g., a path) that includes the received node identifier(s) upon receiving node identifier information. The receiving node may purge its entire path table. For example, the receiving node may purge its entire path table if the received information includes the "ALL NODES" identifier.

The receiving node may perform a AND/CMP operation on a path table entry (e.g., each path table entry). For example, the receiving node may perform a AND/CMP operation on a path table entry upon receiving link identifier information (e.g., if the path information stored in the receiving node's path table is a LIPSIN-compliant path information, the receiving node may perform a AND/CMP operation on a path table entry (e.g., each path table entry)). For each path table entry, an AND operation may be performed for a (e.g., each) received link identifier. The link identifier may be included in the path information. For example, the link identifier may be included in the path information if the AND operation yields non-zero. The path information may be deemed to be affected by the removed link. Affected path information may be removed from the path table.

Depending on the received network update information, the receiving node may have pruned its internal path table. For example, the receiving node may have pruned its internal path table, depending on the received network update information. For example, the receiving node may determine that the network update information affects one or more network paths and does not affect one or more other network paths. The receiving node may prune its internal path table to remove the one or more network paths affected by the network update. The receiving node may store the pruned internal table. Incoming publication requests after the pruning may cause the device (e.g., publisher) to perform the full RV/TM operations. The stale entry may or may not be found in the internal path table. A publication operation utilizing an internal path table entry may act on updated path information (e.g., post-pruning). For example, if the publisher has a message for a subscriber and no path exists because it was pruned from the table, the publisher may request path information from the RV and/or the TM.

The RV function may interrogate its internal rendezvous state (e.g., including the graph of information identifiers being published to the RV and/or node identifiers which may have published and/or subscribed to the given information identifier). For example, the RV function may interrogate its internal rendezvous state if the RV function subscribes to the preselected identifier for the network update information and/or receives node identifier information. The RV function may determine information identifier(s) to which a signaled node identifier may have published and/or subscribed to. The RV function may re-run its matching function (e.g., rematch) and/or trigger a TM operation, which may lead to updating the path information at the publishers as described herein. For example, the RV function may re-run its matching function and/or trigger a TM operation if information identifier(s) are determined. In the case of receiving link information, action may not be taken by the RV function.

Systems, methods, and instrumentalities disclosed herein may result in communication from the TM to publisher/subscriber nodes in the network if node failure and/or link failure occurs. Systems, methods, and instrumentalities disclosed herein may result in communication from the TM to the RV if node failure and/or link failure occurs. Systems, methods, and instrumentalities disclosed herein may result in communication from the publisher/subscriber nodes in the network to the RV at a subsequent incoming publication request after node failure and/or link failure occurs.

Figure 5A:
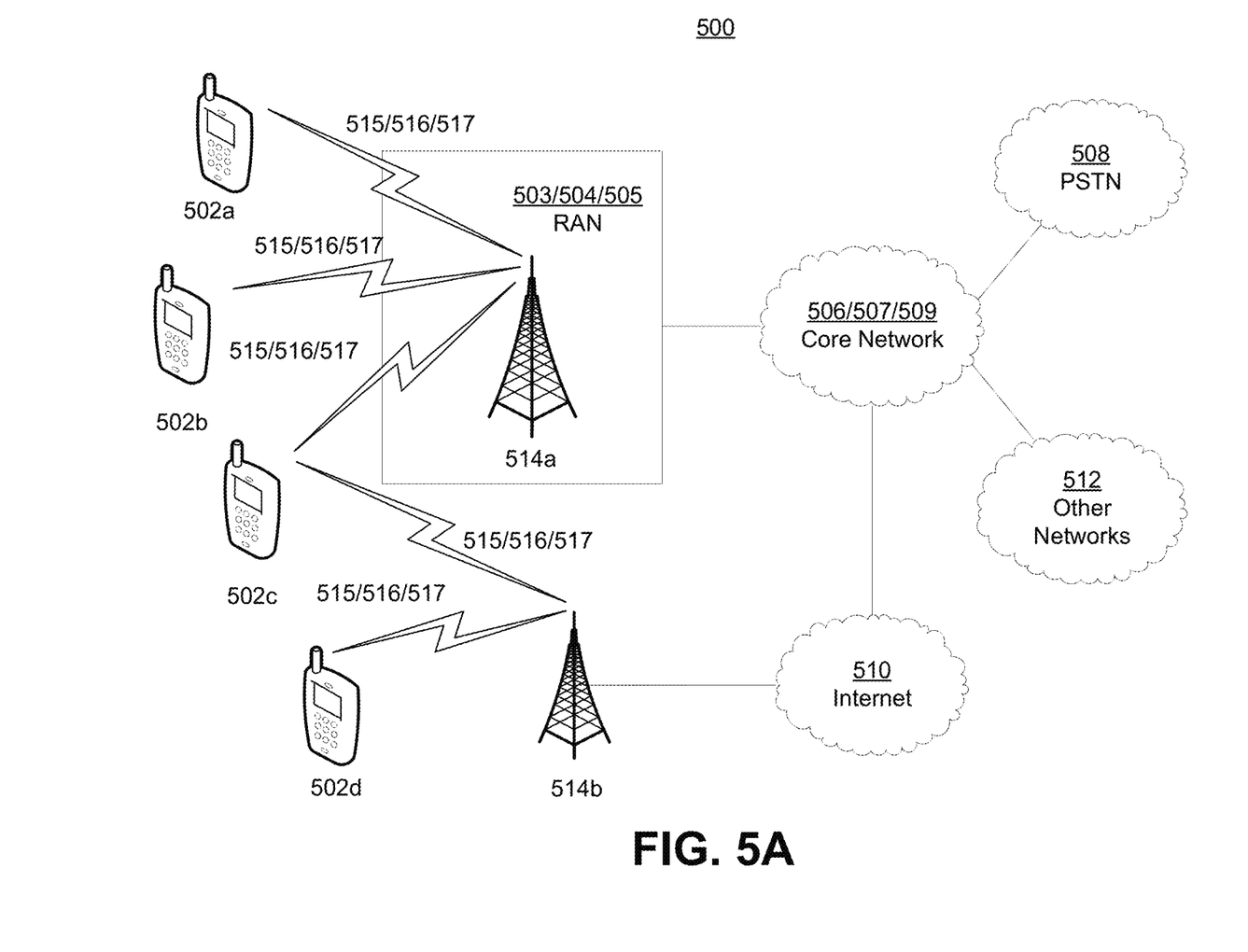
FIG. 5A is a system diagram of an example communications system in which one or more disclosed embodiments may be implemented.

FIG. 5A is a diagram of an example communications system 500 in which one or more disclosed embodiments may be implemented. The communications system 500 may be a multiple access system that provides content, such as voice, data, video, messaging, broadcast, etc., to multiple wireless users. The communications system 500 may enable multiple wireless users to access such content through the sharing of system resources, including wireless bandwidth. For example, the communications system 500 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 5A, the communications system 500 may include wireless transmit/receive units (WTRUs) 502a, 502b. 502c, and/or 502d (which generally or collectively may be referred to as WTRU 502), a radio access network (RAN) 503/504/505, a core network 506/507/509, a public switched telephone network (PSTN) 508, the Internet 510, and other networks 512, though it will be appreciated that the disclosed embodiments contemplate any number of WTRUs, base stations, networks, and/or network elements. Each of the WTRUs 502a. 502b, 502c, 502d may be any type of device configured to operate and/or communicate in a wireless environment. By way of example, the WTRUs 502a, 502b, 502c, 502d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 500 may also include a base station 514a and a base station 514b. Each of the base stations 514a, 514b may be any type of device configured to wirelessly interface with one or more of the WTRUs 502a, 502b, 502c, 502d to facilitate access to one or more communication networks, such as the core network 506/507/509, the Internet 510, and/or the networks 512. By way of example, the base stations 514a, 514b may be a base transceiver station (BTS), a Node-B, an eNode B, a Home Node B, a Home eNode B, a site controller, an access point (AP), a wireless router, and the like. While the base stations 514a, 514b are each depicted as a single element, it will be appreciated that the base stations 514a, 514b may include any number of interconnected base stations and/or network elements.

The base station 514a may be part of the RAN 503/504/505, which may also include other base stations and/or network elements (not shown), such as a base station controller (BSC), a radio network controller (RNC), relay nodes, etc. The base station 514a and/or the base station 514b may be configured to transmit and/or receive wireless signals within a particular geographic region, which may be referred to as a cell (not shown). The cell may further be divided into cell sectors. For example, the cell associated with the base station 514a may be divided into three sectors. Thus, in one embodiment, the base station 514a may include three transceivers, e.g., one for each sector of the cell. In another embodiment, the base station 514a may employ multiple-input multiple output (MIMO) technology and, therefore, may utilize multiple transceivers for each sector of the cell.

The base stations 514a, 514b may communicate with one or more of the WTRUs 502a. 502b, 502c, 502d over an air interface 515/516/517, which may be any suitable wireless communication link (e.g., radio frequency (RF), microwave, infrared (IR), ultraviolet (UV), visible light, etc.). The air interface 515/516/517 may be established using any suitable radio access technology (RAT).

More specifically, as noted above, the communications system 500 may be a multiple access system and may employ one or more channel access schemes, such as CDMA, TDMA, FDMA, OFDMA, SC-FDMA, and the like. For example, the base station 514a in the RAN 503/504/505 and the WTRUs 502a. 502b, 502c may implement a radio technology such as Universal Mobile Telecommunications System (UMTS) Terrestrial Radio Access (UTRA), which may establish the air interface 515/516/517 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 514a and the WTRUs 502a, 502b, 502c may implement a radio technology such as Evolved UMTS Terrestrial Radio Access (E-UTRA), which may establish the air interface 515/516/517 using Long Term Evolution (LTE) and/or LTE-Advanced (LTE-A).

In other embodiments, the base station 514a and the WTRUs 502a. 502b, 502c may implement radio technologies such as IEEE 802.16 (e.g., Worldwide Interoperability for Microwave Access (WiMAX)), CDMA2000, CDMA2000 5x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 514b in FIG. 5A may be a wireless router. Home Node B, Home eNode B, or access point, for example, and may utilize any suitable RAT for facilitating wireless connectivity in a localized area, such as a place of business, a home, a vehicle, a campus, and the like. In one embodiment, the base station 514b and the WTRUs 502c, 502d may implement a radio technology such as IEEE 802.11 to establish a wireless local area network (WLAN). In another embodiment, the base station 514b and the WTRUs 502c, 502d may implement a radio technology such as IEEE 802.15 to establish a wireless personal area network (WPAN). In yet another embodiment, the base station 514b and the WTRUs 502c, 502d may utilize a cellular-based RAT (e.g., WCDMA, CDMA2000, GSM, LTE, LTE-A, etc.) to establish a picocell or femtocell. As shown in FIG. 5A, the base station 514b may have a direct connection to the Internet 510. Thus, the base station 514b may not be required to access the Internet 510 via the core network 506/507/509.

The RAN 503/504/505 may be in communication with the core network 506/507/509, which may be any type of network configured to provide voice, data, applications, and/or voice over internet protocol (VoIP) services to one or more of the WTRUs 502a, 502b, 502c, 502d. For example, the core network 506/507/509 may provide call control, billing services, mobile location-based services, pre-paid calling, Internet connectivity, video distribution, etc., and/or perform high-level security functions, such as user authentication. Although not shown in FIG. 5A, it will be appreciated that the RAN 503/504/505 and/or the core network 506/507/509 may be in direct or indirect communication with other RANs that employ the same RAT as the RAN 503/504/505 or a different RAT. For example, in addition to being connected to the RAN 503/504/505, which may be utilizing an E-UTRA radio technology, the core network 506/507/509 may also be in communication with another RAN (not shown) employing a GSM radio technology.

The core network 506/507/509 may also serve as a gateway for the WTRUs 502a, 502b, 502c, 502d to access the PSTN 508, the Internet 510, and/or other networks 512. The PSTN 508 may include circuit-switched telephone networks that provide plain old telephone service (POTS). The Internet 510 may include a global system of interconnected computer networks and devices that use common communication protocols, such as the transmission control protocol (TCP), user datagram protocol (UDP) and the internet protocol (IP) in the TCP/IP internet protocol suite. The networks 512 may include wired or wireless communications networks owned and/or operated by other service providers. For example, the networks 512 may include another core network connected to one or more RANs, which may employ the same RAT as the RAN 503/504/505 or a different RAT.

Some or all of the WTRUs 502a, 502b, 502c, 502d in the communications system 500 may include multi-mode capabilities, e.g., the WTRUs 502a, 502b, 502c, 502d may include multiple transceivers for communicating with different wireless networks over different wireless links. For example, the WTRU 502c shown in FIG. 5A may be configured to communicate with the base station 514a, which may employ a cellular-based radio technology, and with the base station 514b, which may employ an IEEE 802 radio technology.

Figure 5B:
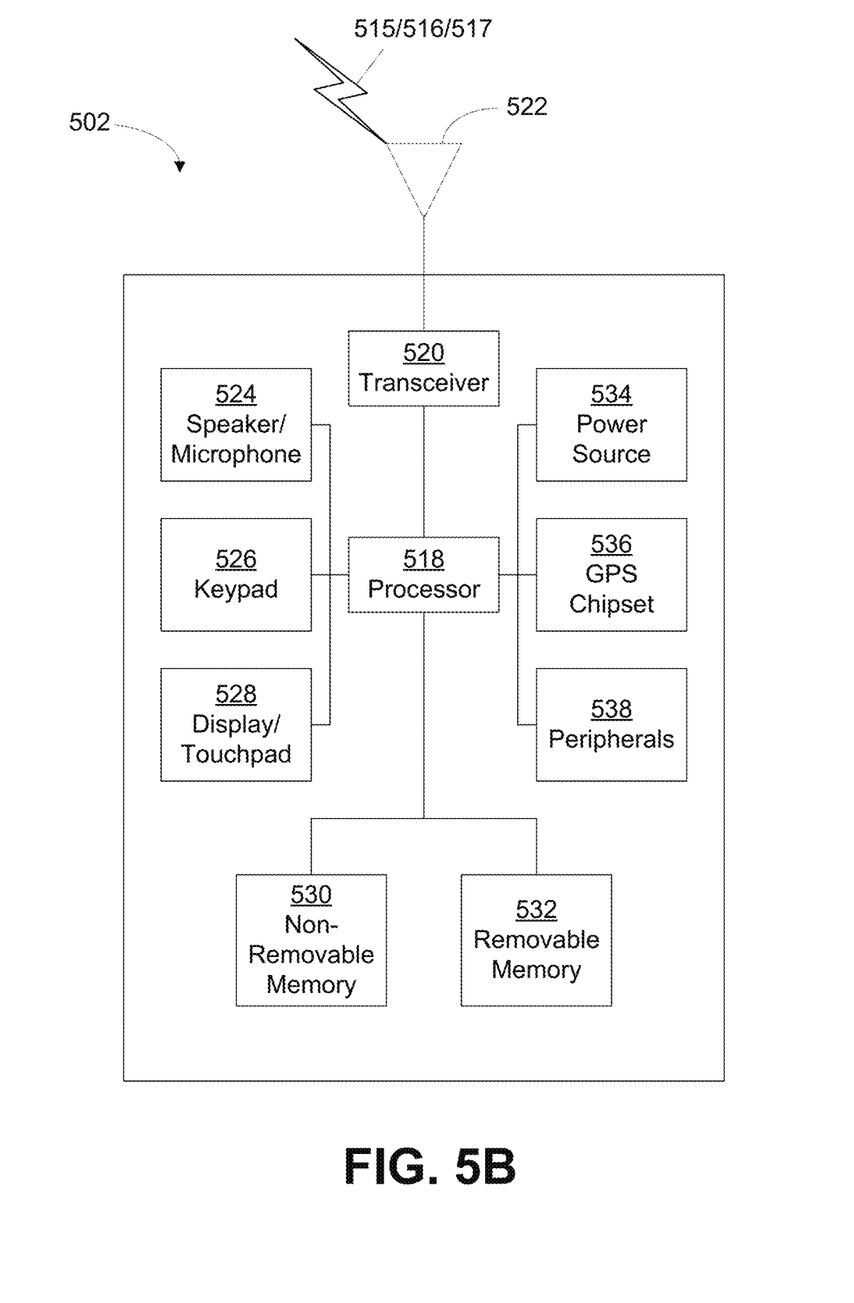
FIG. 5B is a system diagram of an example wireless transmit/receive unit (WTRU) that may be used within the communications system illustrated in FIG. 5A.

FIG. 5B is a system diagram of an example WTRU 502. As shown in FIG. 5B, the WTRU 502 may include a processor 518, a transceiver 520, a transmit/receive element 522, a speaker/microphone 524, a keypad 526, a display/touchpad 528, non-removable memory 530, removable memory 532, a power source 534, a global positioning system (GPS) chipset 536, and other peripherals 538. It will be appreciated that the WTRU 502 may include any subcombination of the foregoing elements while remaining consistent with an embodiment. Also, embodiments contemplate that the base stations 514a and 514b, and/or the nodes that base stations 514a and 514b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 5B and described herein.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 5B depicts the processor 518 and the transceiver 520 as separate components, it will be appreciated that the processor 518 and the transceiver 520 may be integrated together in an electronic package or chip.

The transmit/receive element 522 may be configured to transmit signals to, or receive signals from, a base station (e.g., the base station 514a) over the air interface 515/516/517. For example, in one embodiment, the transmit/receive element 522 may be an antenna configured to transmit and/or receive RF signals. In another embodiment, the transmit/receive element 522 may be an emitter/detector configured to transmit and/or receive IR, UV, or visible light signals, for example. In yet another embodiment, the transmit/receive element 522 may be configured to transmit and receive both RF and light signals. It will be appreciated that the transmit/receive element 522 may be configured to transmit and/or receive any combination of wireless signals.

In addition, although the transmit/receive element 522 is depicted in FIG. 5B as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 515/516/517.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as UTRA and IEEE 802.11, for example.

The processor 518 of the WTRU 502 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other embodiments, the processor 518 may access information from, and store data in, memory that is not physically located on the WTRU 502, such as on a server or a home computer (not shown).

The processor 518 may receive power from the power source 534, and may be configured to distribute and/or control the power to the other components in the WTRU 502. The power source 534 may be any suitable device for powering the WTRU 502. For example, the power source 534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 515/516/517 from a base station (e.g., base stations 514a, 514b) and/or determine its location based on the timing of the signals being received from two or more nearby base stations. It will be appreciated that the WTRU 502 may acquire location information by way of any suitable location-determination implementation while remaining consistent with an embodiment.

The processor 518 may further be coupled to other peripherals 538, which may include one or more software and/or hardware modules that provide additional features, functionality and/or wired or wireless connectivity. For example, the peripherals 538 may include an accelerometer, an e-compass, a satellite transceiver, a digital camera (for photographs or video), a universal serial bus (USB) port, a vibration device, a television transceiver, a hands free headset, a Bluetooth®, module, a frequency modulated (FM) radio unit, a digital music player, a media player, a video game player module, an Internet browser, and the like.

Figure 5C:
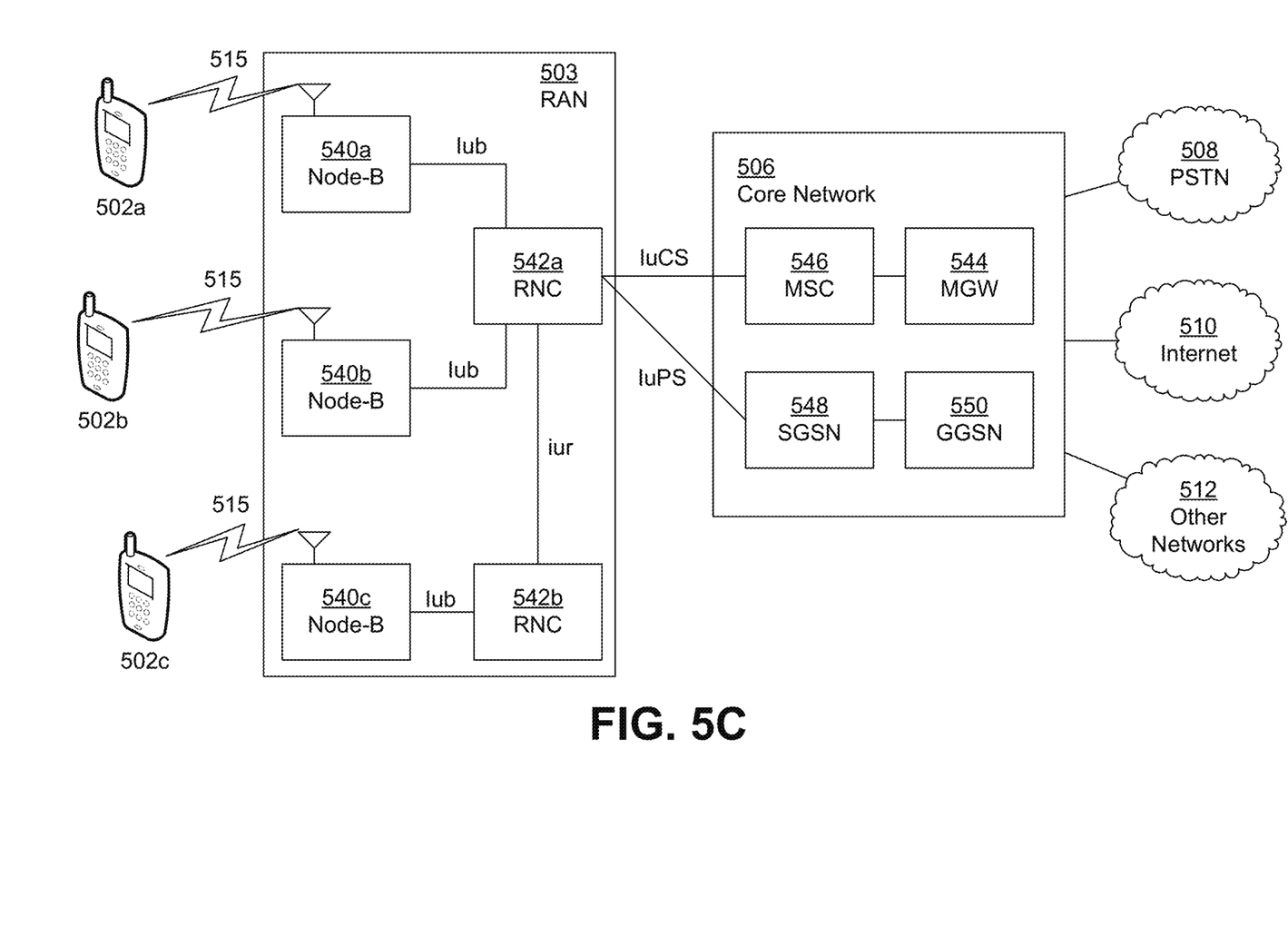
FIG. 5C is a system diagram of an example radio access network and an example core network that may be used within the communications system illustrated in FIG. 5A.

FIG. 5C is a system diagram of the RAN 503 and the core network 506 according to an embodiment. As noted above, the RAN 503 may employ a UTRA radio technology to communicate with the WTRUs 502a, 502b. 502c over the air interface 515. The RAN 503 may also be in communication with the core network 506. As shown in FIG. 5C, the RAN 503 may include Node-Bs 540a, 540b, 540c, which may each include one or more transceivers for communicating with the WTRUs 502a, 502b, 502c over the air interface 515. The Node-Bs 540a, 540b, 540c may each be associated with a particular cell (not shown) within the RAN 503. The RAN 503 may also include RNCs 542a. 542b. It will be appreciated that the RAN 503 may include any number of Node-Bs and RNCs while remaining consistent with an embodiment.

As shown in FIG. 5C, the Node-Bs 540a, 540b may be in communication with the RNC 542a. Additionally, the Node-B 540c may be in communication with the RNC 542b. The Node-Bs 540a, 540b, 540c may communicate with the respective RNCs 542a. 542b via an Iub interface. The RNCs 542a. 542b may be in communication with one another via an Iur interface. Each of the RNCs 542a, 542b may be configured to control the respective Node-Bs 540a, 540b, 540c to which it is connected. In addition, each of the RNCs 542a, 542b may be configured to carry out or support other functionality, such as outer loop power control, load control, admission control, packet scheduling, handover control, macrodiversity, security functions, data encryption, and the like.

The core network 506 shown in FIG. 5C may include a media gateway (MGW) 544, a mobile switching center (MSC) 546, a serving GPRS support node (SGSN) 548, and/or a gateway GPRS support node (GGSN) 550. While each of the foregoing elements are depicted as part of the core network 506, it will be appreciated that any one of these elements may be owned and/or operated by an entity other than the core network operator.

The RNC 542a in the RAN 503 may be connected to the MSC 546 in the core network 506 via an IuCS interface. The MSC 546 may be connected to the MGW 544. The MSC 546 and the MGW 544 may provide the WTRUs 502a. 502b, 502c with access to circuit-switched networks, such as the PSTN 508, to facilitate communications between the WTRUs 502a, 502b, 502c and traditional land-line communications devices.

The RNC 542a in the RAN 503 may also be connected to the SGSN 548 in the core network 506 via an IuPS interface. The SGSN 548 may be connected to the GGSN 550. The SGSN 548 and the GGSN 550 may provide the WTRUs 502a, 502b, 502c with access to packet-switched networks, such as the Internet 510, to facilitate communications between and the WTRUs 502a, 502b, 502c and IP-enabled devices.

As noted above, the core network 506 may also be connected to the networks 512, which may include other wired or wireless networks that are owned and/or operated by other service providers.

Figure 5D:
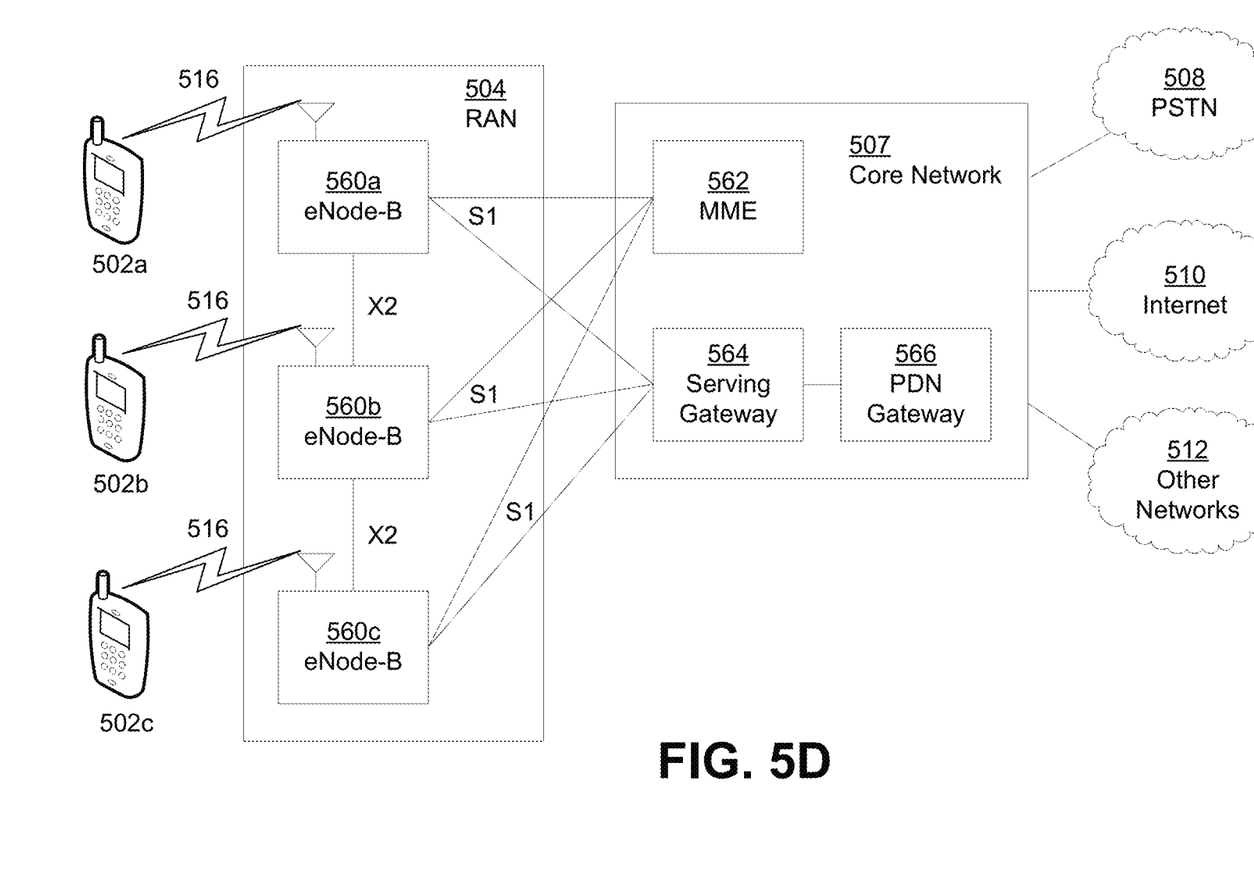
FIG. 5D is a system diagram of another example radio access network and another example core network that may be used within the communications system illustrated in FIG. 5A.

FIG. 5D is a system diagram of the RAN 504 and the core network 507 according to an embodiment. As noted above, the RAN 504 may employ an E-UTRA radio technology to communicate with the WTRUs 502a, 502b, 502c over the air interface 516. The RAN 504 may also be in communication with the core network 507.

The RAN 504 may include eNode-Bs 560a, 560b, 560c, though it will be appreciated that the RAN 504 may include any number of eNode-Bs while remaining consistent with an embodiment. The eNode-Bs 560a, 560b, 560c may each include one or more transceivers for communicating with the WTRUs 502a, 502b. 502c over the air interface 516. In one embodiment, the eNode-Bs 560a, 560b, 560c may implement MIMO technology. Thus, the eNode-B 560a, for example, may use multiple antennas to transmit wireless signals to, and receive wireless signals from, the WTRU 502a.

Each of the eNode-Bs 560a. 560b, 560c may be associated with a particular cell (not shown) and may be configured to handle radio resource management decisions, handover decisions, scheduling of users in the uplink and/or downlink, and the like. As shown in FIG. 5D, the eNode-Bs 560a. 560b, 560c may communicate with one another over an X2 interface.

The core network 507 shown in FIG. 5D may include a mobility management gateway (MME) 562, a serving gateway 564, and a packet data network (PDN) gateway 566. While each of the foregoing elements are depicted as part of the core network 507, it will be appreciated that any one of these elements may be owned and/or operated by an entity other than the core network operator.

The MME 562 may be connected to each of the eNode-Bs 560a. 560b, 560c in the RAN 504 via an S1 interface and may serve as a control node. For example, the MME 562 may be responsible for authenticating users of the WTRUs 502a, 502b, 502c, bearer activation/deactivation, selecting a particular serving gateway during an initial attach of the WTRUs 502a, 502b, 502c, and the like. The MME 562 may also provide a control plane function for switching between the RAN 504 and other RANs (not shown) that employ other radio technologies, such as GSM or WCDMA.

The serving gateway 564 may be connected to each of the eNode-Bs 560a, 560b, 560c in the RAN 504 via the S1 interface. The serving gateway 564 may generally route and forward user data packets to/from the WTRUs 502a, 502b, 502c. The serving gateway 564 may also perform other functions, such as anchoring user planes during inter-eNode B handovers, triggering paging when downlink data is available for the WTRUs 502a. 502b, 502c, managing and storing contexts of the WTRUs 502a, 502b, 502c, and the like.

The serving gateway 564 may also be connected to the PDN gateway 566, which may provide the WTRUs 502a, 502b, 502c with access to packet-switched networks, such as the Internet 510, to facilitate communications between the WTRUs 502a, 502b. 502c and IP-enabled devices.

The core network 507 may facilitate communications with other networks. For example, the core network 507 may provide the WTRUs 502a. 502b, 502c with access to circuit-switched networks, such as the PSTN 508, to facilitate communications between the WTRUs 502a, 502b, 502c and traditional land-line communications devices. For example, the core network 507 may include, or may communicate with, an IP gateway (e.g., an IP multimedia subsystem (IMS) server) that serves as an interface between the core network 507 and the PSTN 508. In addition, the core network 507 may provide the WTRUs 502a, 502b, 502c with access to the networks 512, which may include other wired or wireless networks that are owned and/or operated by other service providers.

Figure 5E:
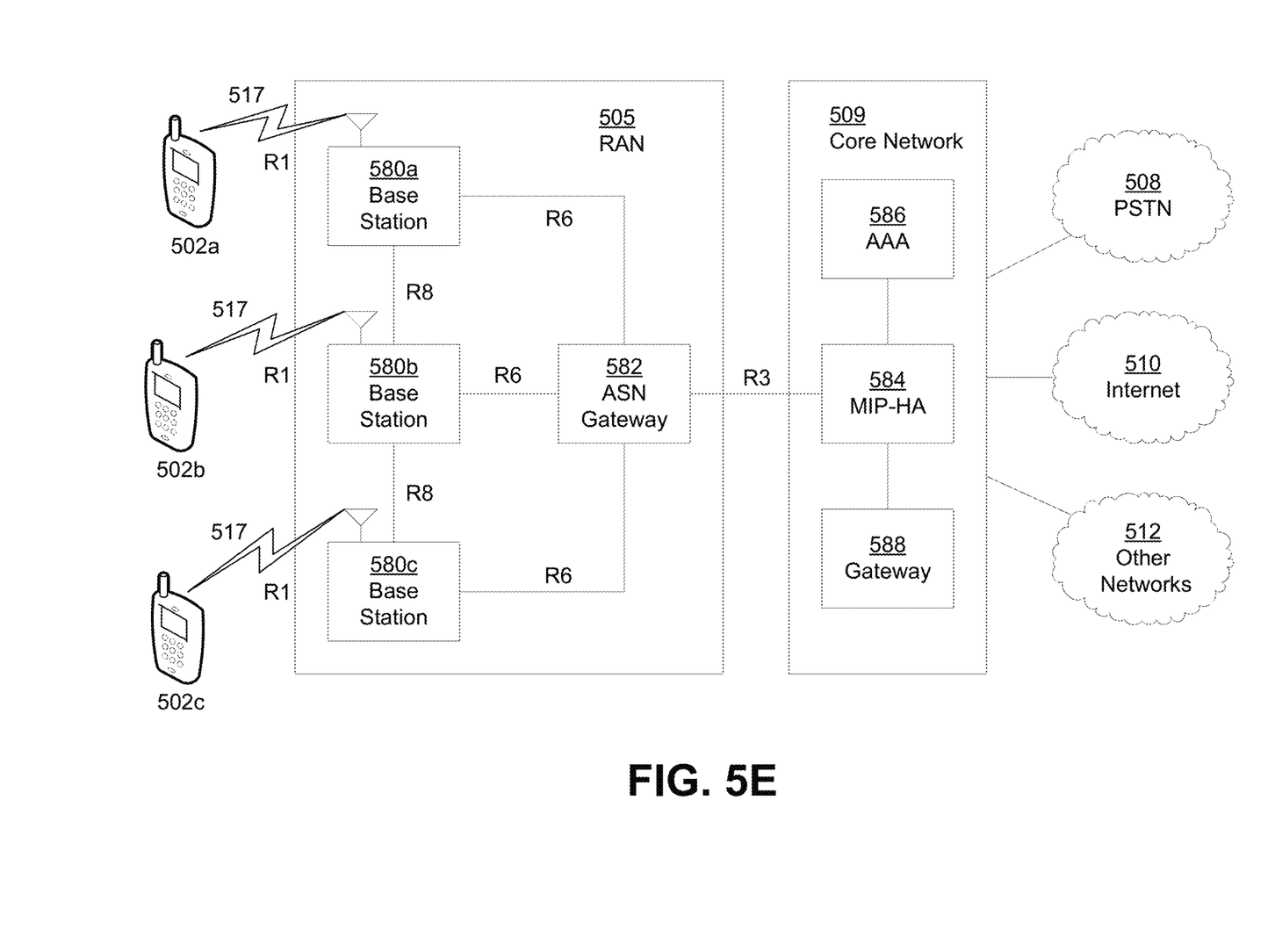
FIG. 5E is a system diagram of another example radio access network and another example core network that may be used within the communications system illustrated in FIG. 5A.

FIG. 5E is a system diagram of the RAN 505 and the core network 509 according to an embodiment. The RAN 505 may be an access service network (ASN) that employs IEEE 802.16 radio technology to communicate with the WTRUs 502a, 502b, 502c over the air interface 517. As will be further discussed below, the communication links between the different functional entities of the WTRUs 502a, 502b, 502c, the RAN 505, and the core network 509 may be defined as reference points.

As shown in FIG. 5E, the RAN 505 may include base stations 580a, 580b, 580c, and an ASN gateway 582, though it will be appreciated that the RAN 505 may include any number of base stations and ASN gateways while remaining consistent with an embodiment. The base stations 580a, 580b, 580c may each be associated with a particular cell (not shown) in the RAN 505 and may each include one or more transceivers for communicating with the WTRUs 502a, 502b, 502c over the air interface 517. In one embodiment, the base stations 580a, 580b, 580c may implement MIMO technology. Thus, the base station 580a, for example, may use multiple antennas to transmit wireless signals to, and receive wireless signals from, the WTRU 502a. The base stations 580a, 580b, 580c may also provide mobility management functions, such as handoff triggering, tunnel establishment, radio resource management, traffic classification, quality of service (QoS) policy enforcement, and the like. The ASN gateway 582 may serve as a traffic aggregation point and may be responsible for paging, caching of subscriber profiles, routing to the core network 509, and the like.

The air interface 517 between the WTRUs 502a, 502b, 502c and the RAN 505 may be defined as an R1 reference point that implements the IEEE 802.16 specification. In addition, each of the WTRUs 502a, 502b, 502c may establish a logical interface (not shown) with the core network 509. The logical interface between the WTRUs 502a, 502b, 502c and the core network 509 may be defined as an R2 reference point, which may be used for authentication, authorization, IP host configuration management, and/or mobility management.

The communication link between each of the base stations 580a, 580b, 580c may be defined as an R8 reference point that includes protocols for facilitating WTRU handovers and the transfer of data between base stations. The communication link between the base stations 580a, 580b. 580c and the ASN gateway 582 may be defined as an R6 reference point. The R6 reference point may include protocols for facilitating mobility management based on mobility events associated with each of the WTRUs 502a. 502b, 502c.

As shown in FIG. 5E, the RAN 505 may be connected to the core network 509. The communication link between the RAN 505 and the core network 509 may defined as an R3 reference point that includes protocols for facilitating data transfer and mobility management capabilities, for example. The core network 509 may include a mobile IP home agent (MIP-HA) 584, an authentication, authorization, accounting (AAA) server 586, and a gateway 588. While each of the foregoing elements are depicted as part of the core network 509, it will be appreciated that any one of these elements may be owned and/or operated by an entity other than the core network operator.

The MIP-HA may be responsible for IP address management, and may enable the WTRUs 502a, 502b, 502c to roam between different ASNs and/or different core networks. The MIP-HA 584 may provide the WTRUs 502a, 502b, 502c with access to packet-switched networks, such as the Internet 510, to facilitate communications between the WTRUs 502a, 502b, 502c and IP-enabled devices. The AAA server 586 may be responsible for user authentication and for supporting user services. The gateway 588 may facilitate interworking with other networks. For example, the gateway 588 may provide the WTRUs 502a, 502b, 502c with access to circuit-switched networks, such as the PSTN 508, to facilitate communications between the WTRUs 502a, 502b, 502c and traditional land-line communications devices. In addition, the gateway 588 may provide the WTRUs 502a, 502b, 502c with access to the networks 512, which may include other wired or wireless networks that are owned and/or operated by other service providers.

Although not shown in FIG. 5E, it will be appreciated that the RAN 505 may be connected to other ASNs and the core network 509 may be connected to other core networks. The communication link between the RAN 505 the other ASNs may be defined as an R4 reference point, which may include protocols for coordinating the mobility of the WTRUs 502a, 502b, 502c between the RAN 505 and the other ASNs. The communication link between the core network 509 and the other core networks may be defined as an R5 reference, which may include protocols for facilitating interworking between home core networks and visited core networks.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A wireless transmit/receive unit (WTRU) configured to communicate with subscribers in an information centric networking (ION) environment, the WTRU comprising:
   a memory; and
   a processor configured to:
      store, in the memory, a first path to a subscriber;
      receive a message from a topology manager indicating a change to a network topology;
      determine from the message that the change to the network topology relates to the first path to the subscriber;
      remove the first path to the subscriber from the memory;
      send a path request to the topology manager for a second path to the subscriber when it is determined that the first path is missing from the memory and the WTRU has data to be sent to the subscriber; and
      receive the second path from the topology manager and store the second path in the memory.

2. The WTRU of claim 1, wherein the change to the network topology comprises at least one of the subscriber joining the ICN, the subscriber leaving the ICN, a network link joining the ICN, a network link leaving the ION, or a failure of a network link.

3. The WTRU of claim 1, wherein the processor is further configured to send a subscription request to the topology manager.

4. The WTRU of claim 1, wherein the processor is further configured to send a subscription request to subscribe to an information identifier of the topology manager.

5. The WTRU of claim 1, wherein the WTRU is a publisher.

6. The WTRU of claim 1, wherein the WTRU is a rendezvous RV function.

7. The WTRU of claim 1, wherein the subscriber is a first subscriber, and the processor is further configured to store a third path to a second subscriber, determine from the message that the change to the network topology does not relate to the third path for the second subscriber, and maintain the third path to the second subscriber in the memory.

8. A method performed by a wireless transmit/receive unit (WTRU) for communicating with subscribers in an information centric networking (ICN) environment, the method comprising:

storing, by the WTRU, a first path to a subscriber in a memory;

receiving, by the WTRU, a message from a topology manager indicating a change to a network topology;

determining, by the WTRU, from the message that the change to the network topology relates to the first path to the subscriber;

removing, by the WTRU, the first path to the subscriber from the memory;

determining, by the WTRU, that the WTRU has data to be sent to the subscriber;

sending, by the WTRU, a path request to the topology manager for a second path to the subscriber when it is determined that the first path is missing from the memory and the WTRU has data to be sent to the subscriber;

receiving, by the WTRU, the second path from the topology manager; and storing, by the WTRU, the second path in the memory.

9. The method of claim 8, wherein the change to the network topology comprises at least one of the subscriber joining the ICN, the subscriber leaving the ICN, a network link joining the ICN, a network link leaving the ICN, or a failure of a network link.

10. The method of claim 8, wherein the method further comprises sending a subscription request to the topology manager.

11. The method of claim 8, wherein the method further comprises sending a subscription request to an information identifier of the topology manager.

12. The method of claim 8, wherein the WTRU is a publisher.

13. The method of claim 8, wherein the WTRU is a rendezvous RV function.

14. The method of claim 8, wherein the subscriber is a first subscriber, and the method further comprises sorting a third path to a second subscriber, determining from the message that the change of the network topology does not relate to the third path for the second subscriber, and maintain the third path to the second subscriber in the memory.

15. A device configured to communicate with a wireless transmit/receive (WTRU) in an information centric networking (ICN) environment, the device comprising:
a memory; and
a processor configured to:
 determine a change in a network topology;
 send a message to the WTRU to notify the WTRU that the change that has occurred to the network topology relates a first path to a subscriber;
 receive a path request from the WTRU, wherein the path request indicates that the first path is missing from the WTRU and indicates a request for a second path to be used by the WTRU to send data to the subscriber; and
 send the WTRU the second path to the subscriber.

16. The device of claim 15, wherein the change to the network topology comprises at least one of the subscriber joining the ICN, the subscriber leaving the ICN, a network link joining the ICN, a network link leaving the ICN, or a failure of a network link.

17. The device of claim 15, wherein the processor is further configured to receive a subscription request from the WTRU.

18. The device of claim 15, wherein the processor is further configured to receive a subscription request to subscribe to an information identifier of a topology manager.

19. The device of claim 15, wherein the device is a topology manager.

20. The device of claim 15, wherein the WTRU is a publisher.

21. A method used by a device for communicating with a wireless transmit/receive unit (WTRU) in an information centric networking (ICN) environment, the method comprising:
determining, by the device, a change in a network topology;
sending, by the device, a message to the WTRU to notify the WTRU that the change has occurred to the network topology that relates to a first path to a subscriber;
receiving, by the device, a path request from the WTRU, wherein the path request indicates that the first path is missing from the WTRU and indicates a request for a second path to be used by the WTRU to send data to the subscriber; and
sending, by the device, the WTRU the second path to the subscriber.

22. The method of claim 21, wherein the change to the network topology comprises at least one of the subscriber joining the ICN, the subscriber leaving the ICN, a network link joining the ICN, a network link leaving the ICN, or a failure of a network link.

23. The method of claim 21, the method further comprising receiving a subscription request from the WTRU.

24. The method of claim 21, the method further comprising receiving a subscription request to subscribe to an information identifier of a topology manager.

25. The method of claim 21, wherein the device is a topology manager.

26. The method of claim 21, wherein the WTRU is a publisher.

* * * * *